(12) United States Patent
Zelczer

(10) Patent No.: US 6,564,819 B2
(45) Date of Patent: May 20, 2003

(54) FLUID FLOW CONTROL DAMPER ASSEMBLY

(76) Inventor: Alex Zelczer, 3840 Severn Rd., Cleveland Heights, OH (US) 44118

( * ) Notice: Subject to any disclaimer, the term of this patent is extended or adjusted under 35 U.S.C. 154(b) by 0 days.

(21) Appl. No.: 09/826,112

(22) Filed: Apr. 4, 2001

(65) Prior Publication Data

US 2002/0144737 A1 Oct. 10, 2002

(51) Int. Cl.[7] .............................................. F16K 11/22
(52) U.S. Cl. ........................ 137/15.25; 137/601.11; 251/58; 251/62; 251/306
(58) Field of Search ................. 137/601.09, 601.11, 137/454.2, 15.25; 251/58, 62, 305, 306, 307, 308; 92/223, 248; 454/325, 326, 330

(56) References Cited

U.S. PATENT DOCUMENTS

| | | | |
|---|---|---|---|
| 1,248,926 A | 12/1917 | Schantz ...................... 251/306 |
| 2,315,775 A | 4/1943 | D'Arcey ..................... 137/139 |
| 2,883,144 A | 4/1959 | Kendig ......................... 251/58 |
| 3,028,878 A | 4/1962 | Natho ......................... 137/556 |
| 3,298,659 A | 1/1967 | Cupedo ........................ 251/14 |
| 3,367,365 A | 2/1968 | Stevens ....................... 137/553 |
| 3,613,518 A | 10/1971 | Prosser .......................... 92/98 |
| 3,640,499 A | * 2/1972 | Jung .......................... 251/118 |
| 3,695,149 A | * 10/1972 | Eberhart ..................... 92/248 |
| 3,771,759 A | 11/1973 | Pauquette .................... 251/58 |
| 3,794,288 A | * 2/1974 | Dolder et al. ................ 251/58 |
| 3,799,434 A | 3/1974 | Heidacker ................... 236/101 |
| 4,213,477 A | 7/1980 | Velasquez .................... 137/15 |
| 4,241,897 A | 12/1980 | Maezawa .................... 251/229 |
| 4,251,050 A | 2/1981 | McInerney ................... 251/61 |
| 4,270,559 A | 6/1981 | Wallberg ..................... 137/15 |
| 4,332,271 A | 6/1982 | Rohr .......................... 137/315 |
| 4,391,184 A | 7/1983 | Yamane et al. ............... 92/100 |
| 4,423,748 A | 1/1984 | Ellett ......................... 137/315 |
| 4,504,038 A | 3/1985 | King ........................... 251/58 |
| 4,711,158 A | 12/1987 | Kayyod et al. ................ 92/94 |
| 4,864,918 A | 9/1989 | Martin ........................ 92/103 |
| 4,915,017 A | 4/1990 | Perlov ......................... 92/5 R |
| 5,165,657 A | 11/1992 | McLennan .................. 251/229 |
| 5,363,743 A | 11/1994 | Raddatz et al. ............... 92/98 |
| 5,458,148 A | * 10/1995 | Zelczer et al. .............. 251/308 |

FOREIGN PATENT DOCUMENTS

DE         31 45757 A1      5/1983

* cited by examiner

Primary Examiner—Stephen M. Hepperle
(74) Attorney, Agent, or Firm—Renner, Otto, Boisselle & Sklar, LLP

(57) ABSTRACT

A fluid flow control damper assembly having a damper vane and a piston actuator is relatively easy to install when the outer surface of a duct is inaccessible. The piston actuator includes a powder metal piston, lacking an elastomeric (for example, rubber) seal, that is closely received within a glass cylinder. The glass cylinder has a fitting that closes one end of the cylinder and is connectable to a pneumatic control system. A drive rod is connected between the piston and the damper vane to move the damper vane between an open position and a closed position.

27 Claims, 7 Drawing Sheets

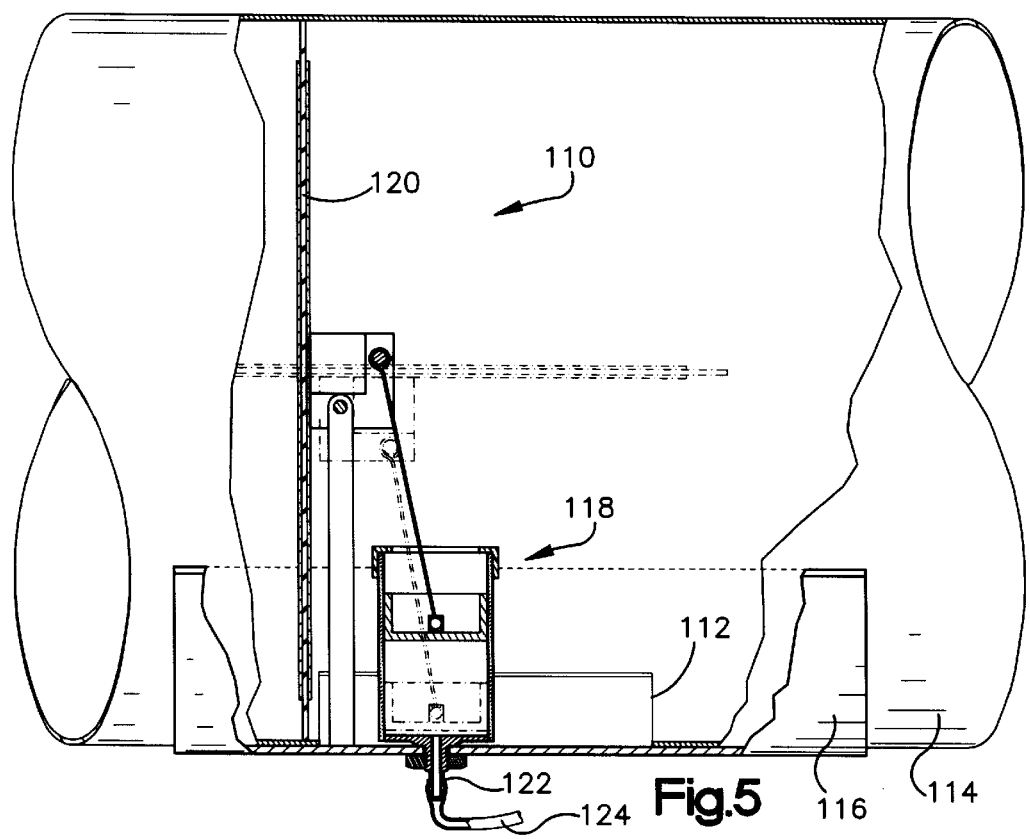
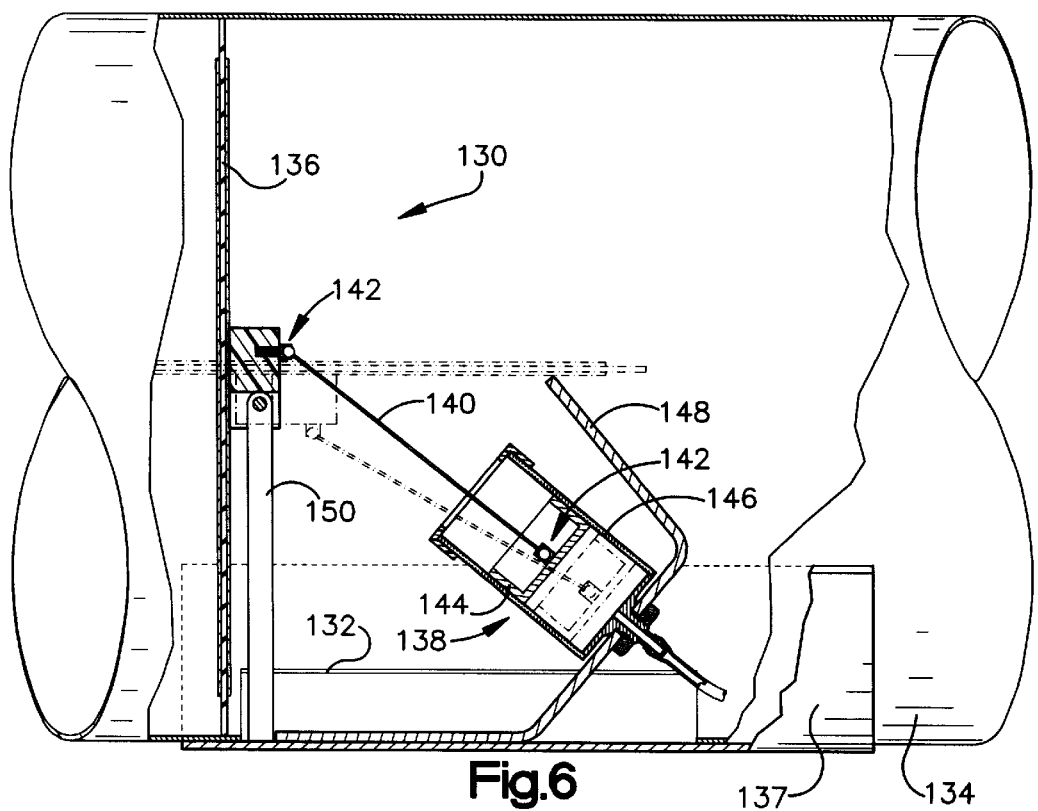

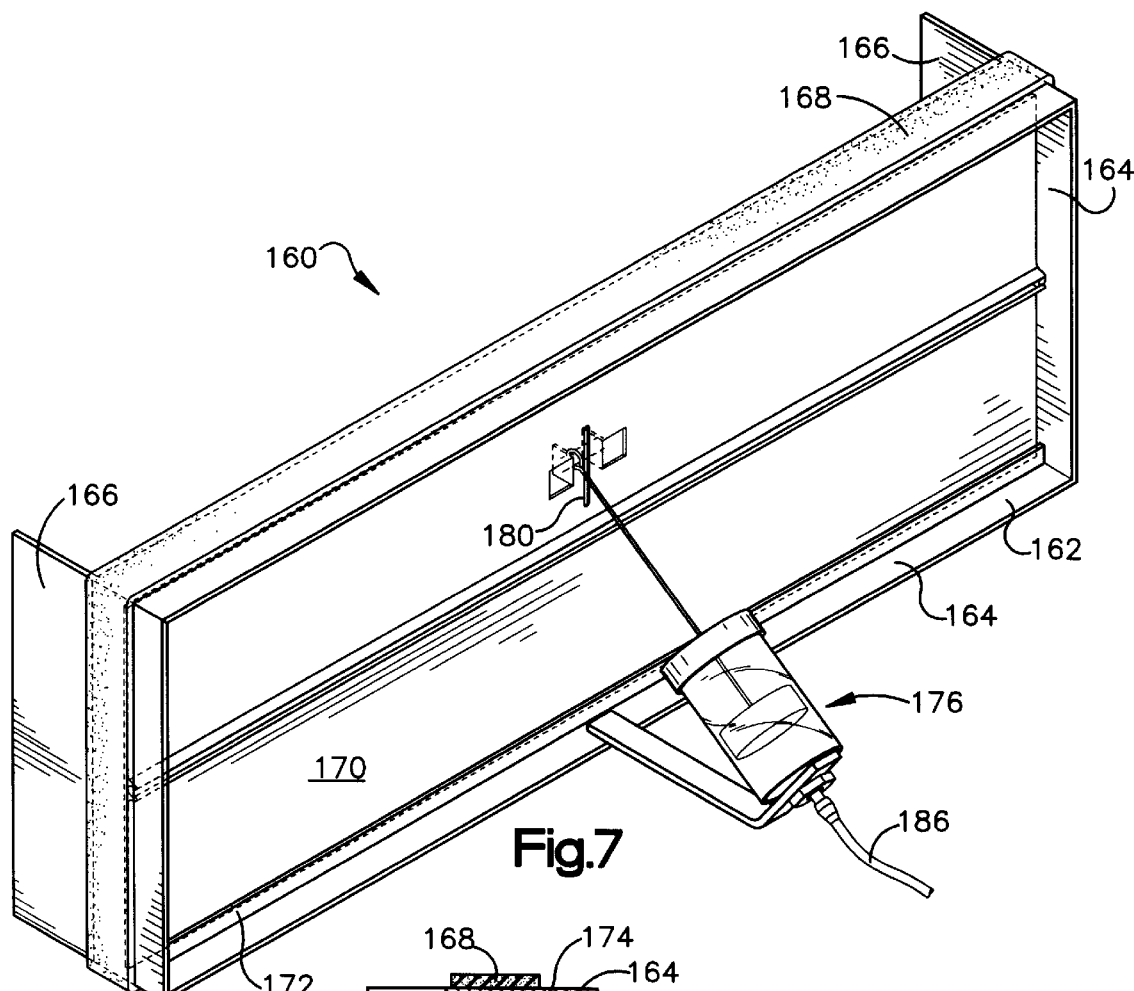
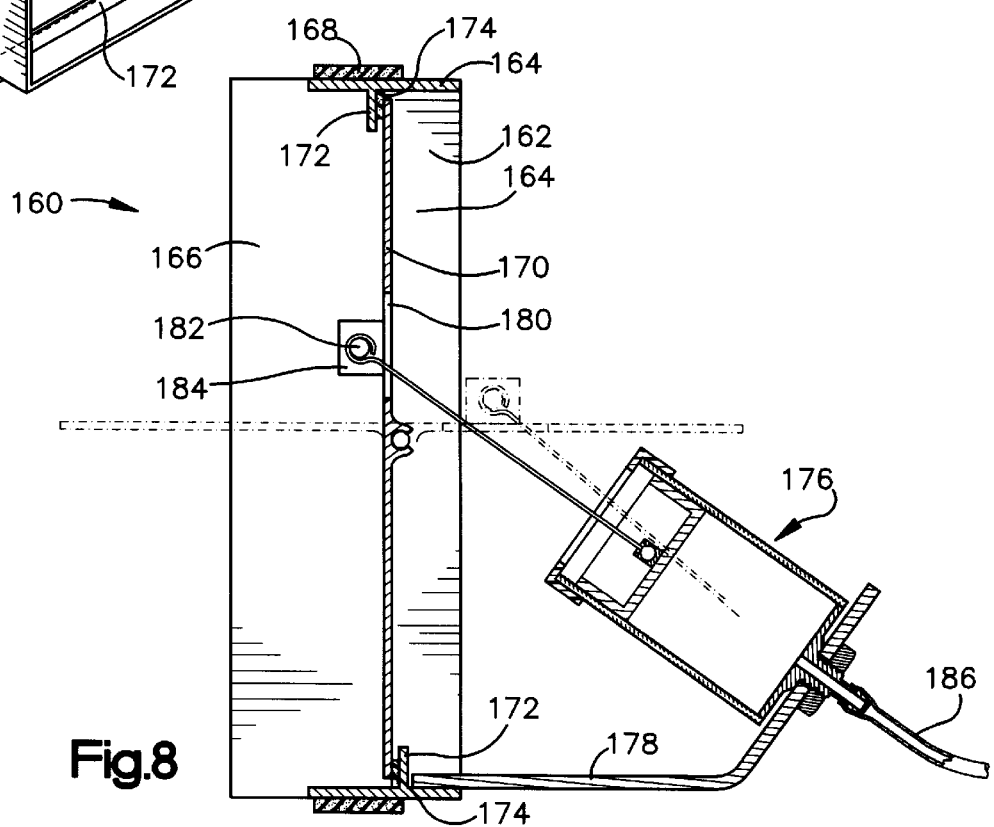

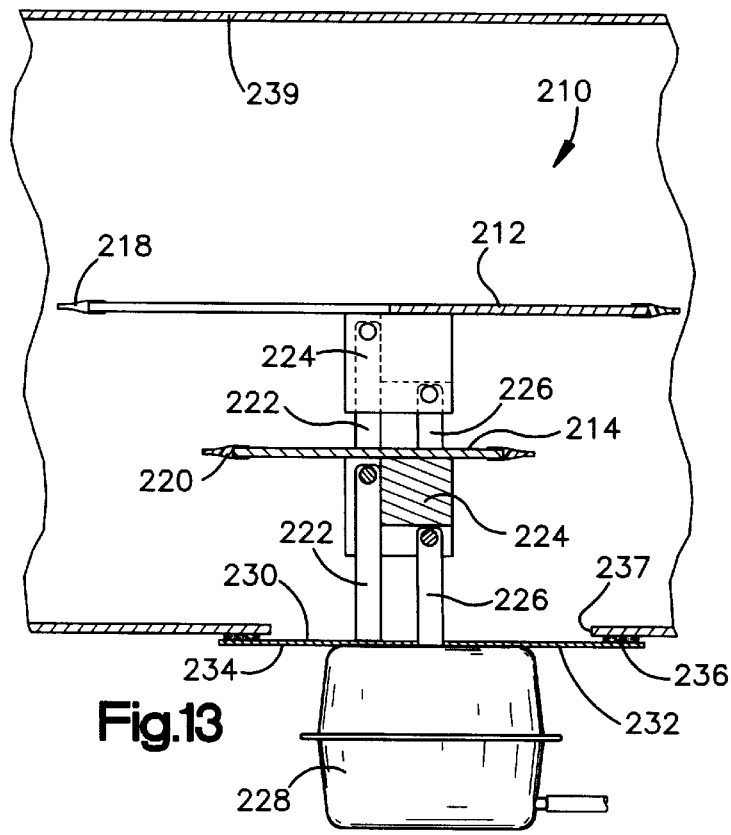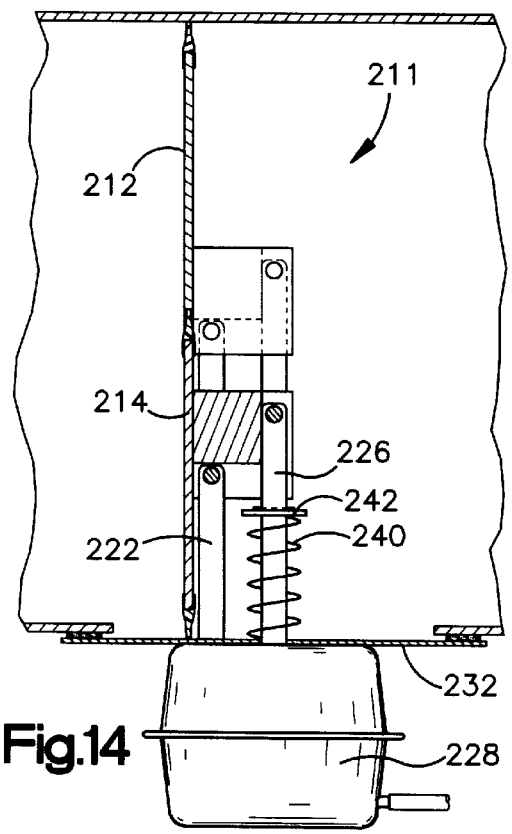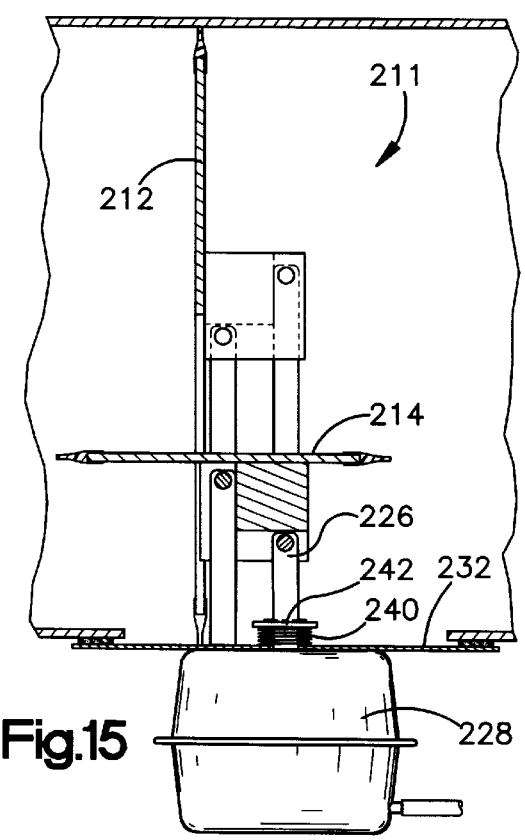

FLUID FLOW CONTROL DAMPER ASSEMBLY

FIELD OF THE INVENTION

The invention relates generally to fluid flow control dampers and more particularly to a low pressure fluid operated fluid flow control damper assembly particularly useful in HVAC systems.

BACKGROUND OF THE INVENTION

Fluid flow control dampers are used in a wide variety of applications, including (heating, ventilation and air conditioning) HVAC systems. In HVAC systems, dampers are used to control the supply of conditioned air to various rooms or zones within a building. One such damper device is a mechanical damper assembly including a short piece of duct in which a damper vane is pivotally mounted by a shaft. The damper vane is rotatable between open and closed positions by a motor that is mounted outside the duct and connected to the vane shaft.

The aforesaid type of mechanical damper assembly is somewhat difficult to install in an existing duct. Installation requires the duct piece of the damper assembly to be spliced into an existing duct. This involves cutting a length from the existing duct and usually dismantling the existing duct to enable such cutting and/or assembly of the duct piece between adjacent sections of the existing duct. This dismantling, cutting and reassembly of the duct work is time consuming and expensive.

Dampers also have been employed at room registers to control the flow of air into a room. These dampers typically include a pivotally mounted damper vane on the duct side of the register and an actuator lever which protrudes on the room side of the register for enabling manual adjustment of the damper vane. The dampers are wall or ceiling mounted over a duct opening or slip fitted in a duct opening provided in the floor.

Also known are pneumatically actuated damper assemblies. Reference may be had, for example, to U.S. Pat. No. 5,458,148 which discloses a self-contained unit comprising a support base for external mounting to a side of a duct and a damper vane mounted to the support base for movement between open and closed positions. The damper vane is located inwardly of the inner side of the support base for positioning interiorly of the duct when the support base is mounted to the duct. An actuator is mounted to the support base at the exterior side thereof and is operatively connected to the damper vane by a linkage for moving the damper between the open and closed positions. The support base functions to close an access opening in the side wall of the duct of sufficient size to permit insertion of the damper vane therethrough.

SUMMARY OF THE INVENTION

The present invention provides a novel fluid flow control damper assembly that overcomes drawbacks associated with and/or improves upon prior art damper assemblies. Several embodiments of a damper assembly according to the present invention are self-contained units that are compact and relatively easy to install in existing ducts, including in situations where the outside surface of the duct is inaccessible.

A damper assembly according to one aspect of the present invention includes a damper vane and a pneumatic piston-cylinder actuator connected to the damper vane for moving the damper vane between an open position and a closed position. The piston-cylinder actuator includes a piston and a cylinder that have cooperating nonelastomeric sliding sealing surfaces which provide essentially friction-free axial movement of the piston relative to the cylinder. The surfaces at the sliding interface between the piston and the cylinder preferably are smooth and function to provide a substantially air tight seal, thereby eliminating the need for elastomeric seals that normally would introduce additional friction into the actuator.

The piston and/or the cylinder are formed of a material selected from the group including metal, powdered metal, resin, glass, and polymer. The piston and/or the cylinder also may have a friction-reducing coating on the sealing surface thereof. Preferably, the piston-cylinder actuator has a powder-metal piston and a glass cylinder.

According to another aspect of the invention, the damper assembly includes a base, to which the damper vane and the piston-cylinder actuator are mounted, preferably on the same side of the base as the piston-cylinder actuator. The actuator may be controllably connected to a pneumatic control system through a fitting at one end of the cylinder, and the fitting may have a threaded portion for mounting the actuator with respect to the base. The base may be configured for mounting to the exterior of a duct, in which case the piston-cylinder actuator may be mounted to the base with a nipple portion of the actuator fitting is disposed at an exterior side of the base for connection to the pneumatic control system. As a result, the piston actuator presents a minimal profile outside the duct, which is advantageous in shallow clearance situations, as well as providing an improved appearance.

The damper vane and the piston-cylinder actuator may be interconnected by a drive rod. The drive rod may be mounted to transfer substantially only axial forces from the actuator to the damper vane, for example, by using ball joints to connect the ends of the drive rod to the damper vane and the actuator piston. This arrangement prevents lateral or twisting forces from acting on the drive rod, which otherwise may cause the piston to bind in the cylinder. In addition, the actuator does not have to be precisely aligned with the damper vane, thereby facilitating manufacturing and installation.

The piston-cylinder actuator also may have a cylindrical cap that fits over an end of the cylinder to retain the piston in the cylinder. The cap has an oversized opening for passage of the drive rod therethrough. Particularly if the cylinder is made of glass, a substantially cylindrical protective boot may be used to substantially cover the outer circumferential surface of the cylinder. The boot preferably is made of an elastomer, such as rubber, to protect the cylinder, particularly prior to and during installation.

The damper vane also may include a plurality of damper vanes that cooperate to close a cross-section of a duct when the damper vanes are in closed positions, and a plurality of piston actuators. Each piston actuator is operatively connected to one of the damper vanes for opening and closing the damper vanes. The plurality of damper vanes may include a first damper vane that has an aperture, and a second damper vane that closes the aperture when both the first damper vane and the second damper vane are in their respective closed positions. The damper vanes lie in substantially parallel planes when both the damper vanes are in their open positions to present a minimal profile to the airflow. The plurality of damper vanes are used to supply different volumes of air through the damper assembly to mix fresh air with return air in varying proportions, to provide a varied amount of conditioned air according to varied requirements and/or to supply a constant but smaller amount of airflow until a greater or full amount of air supply is needed.

The damper assembly may include a spring connected to the damper vane for biasing the damper vane to a predetermined position. This feature is particularly advantageous in the event of a power failure, to automatically open or close the damper vane under the action of the spring.

According to another aspect of the invention, a damper assembly may have a frame, a damper vane mounted to the frame for pivotal movement between open and closed positions, and an actuator for moving the damper vane between the open and closed positions. The frame has a cross-sectional shape that approximates or generally corresponds to a cross-sectional shape of a duct into which the damper assembly may be installed. The frame preferably has a gasket or elastomeric member disposed on the exterior thereof or positioned about at least a portion of its outer periphery to sealingly engage the frame with a duct wall. The actuator is located within the confines of a projection of the frame in an axial direction. Accordingly, the damper assembly may be inserted into an open end of a duct with the actuator disposed within the duct.

According to a further aspect of the invention, there is provided a method of installing a damper assembly, the method including the steps of removing a register from an outlet of a duct, inserting the damper assembly into a duct adjacent the outlet, and replacing the register. Thus, the simple method provided by the present invention may be used to retrofit a building where access to the ductwork is otherwise unavailable.

According to another aspect of the present invention, a damper assembly may include at least two duct wall-engaging members movable towards each other against a biasing force. The duct wall-engaging members preferably apply substantially equal forces against opposing walls of the duct to center and align the damper assembly in the duct. The duct wall-engaging members may apply unequal force against the duct wall to position the damper assembly off-center as well. The duct wall-engaging members may be formed by a leaf spring extending from lateral sides of the base, and may have integral handle portions for easily grasping the damper assembly for insertion into a duct. Installation in a duct may be affected by retracting the duct wall-engaging members against the biasing force, inserting the damper assembly into the duct, and releasing the duct wall-engaging members so that the biasing force presses the duct-wall engaging members against the duct walls to hold, align and preferably center the damper assembly in a fixed location within the duct. A damper assembly having such wall-engaging members is particularly advantageous when the external surface of the duct is inaccessible, permitting the damper assembly to be installed from an end of the duct, perhaps with just one hand. Automatic self-centering is a particular advantage in a blind installation where the installer cannot easily see into the duct. By automatically centering the damper assembly, the present invention also minimizes the chance that rigid portions of the damper vane would scrape against the duct wall as the damper vane moves between its open and closed positions. The damper assembly is thus more likely to operate quietly.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

BRIEF DESCRIPTION OF THE DRAWINGS

FIG. 5 is a partial sectional view of another damper assembly in accordance with the present invention in a duct.

FIG. 6 is a partial sectional side view of another damper assembly in accordance with the present invention in a duct.

FIG. 7 is a rear perspective view of another damper assembly in accordance with the present invention.

FIG. 8 is cross-sectional side view of the damper assembly of FIG. 7.

FIG. 13 is a cross-sectional side view of the damper assembly of FIG. 10 with both vanes in respective open positions.

FIG. 14 is a cross-sectional side view of another damper assembly in accordance with the present invention.

FIG. 15 is a cross-sectional side view of the damper assembly of FIG. 14 with a damper vane in an open position.

DETAILED DESCRIPTION

Figure 1:
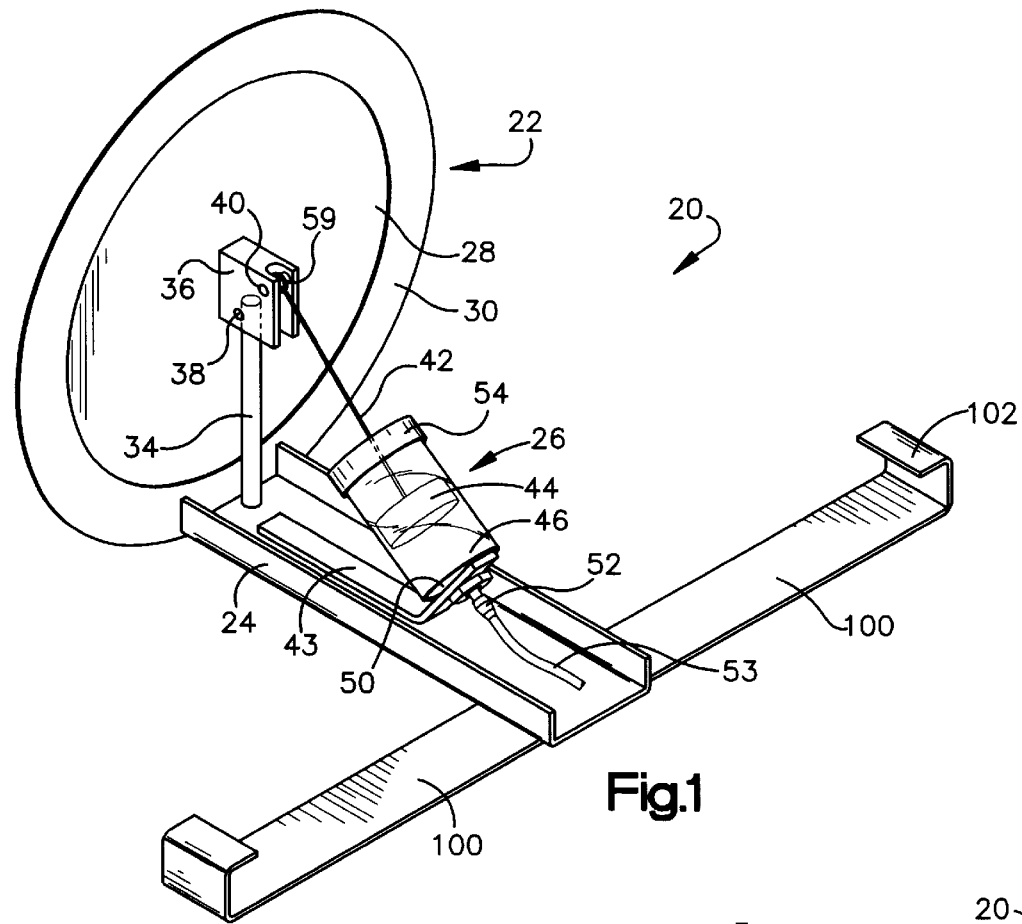
FIG. 1 is a perspective side view of a damper assembly in accordance with the present invention.
Figure 2:
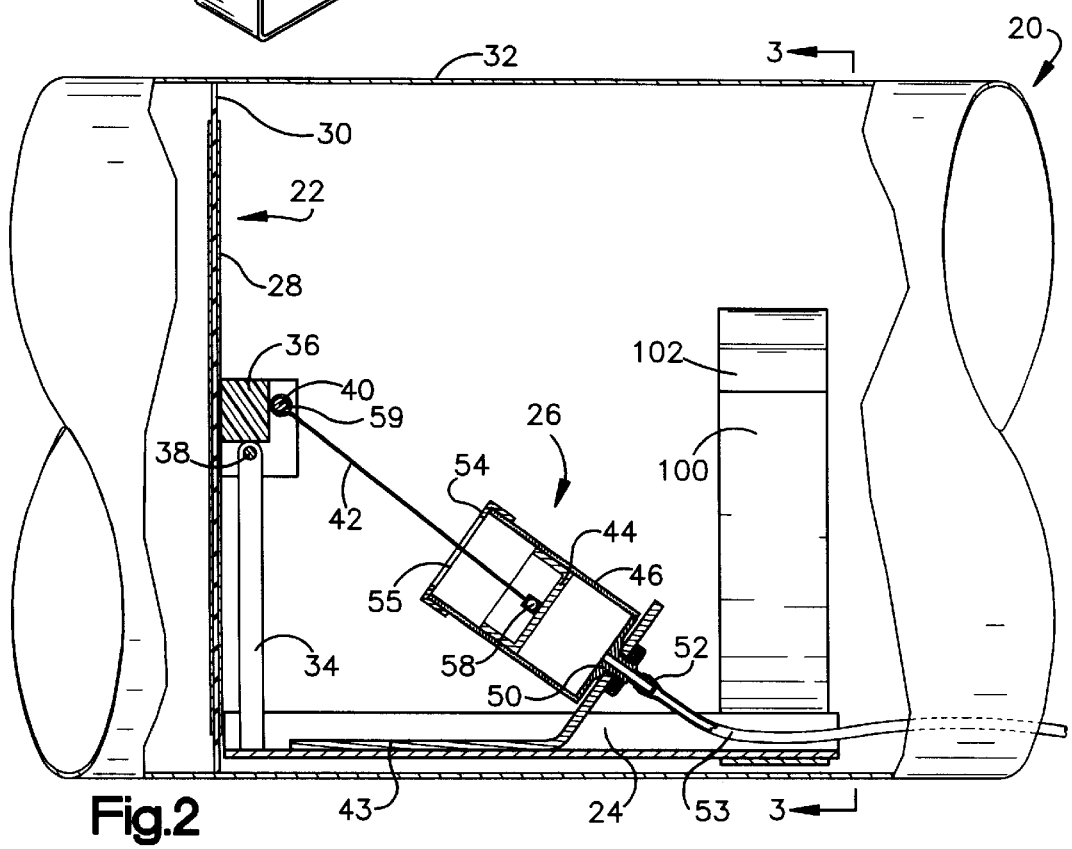
FIG. 2 is a partial cross-sectional side view of a duct including the damper assembly of FIG. 1.
Figure 3:
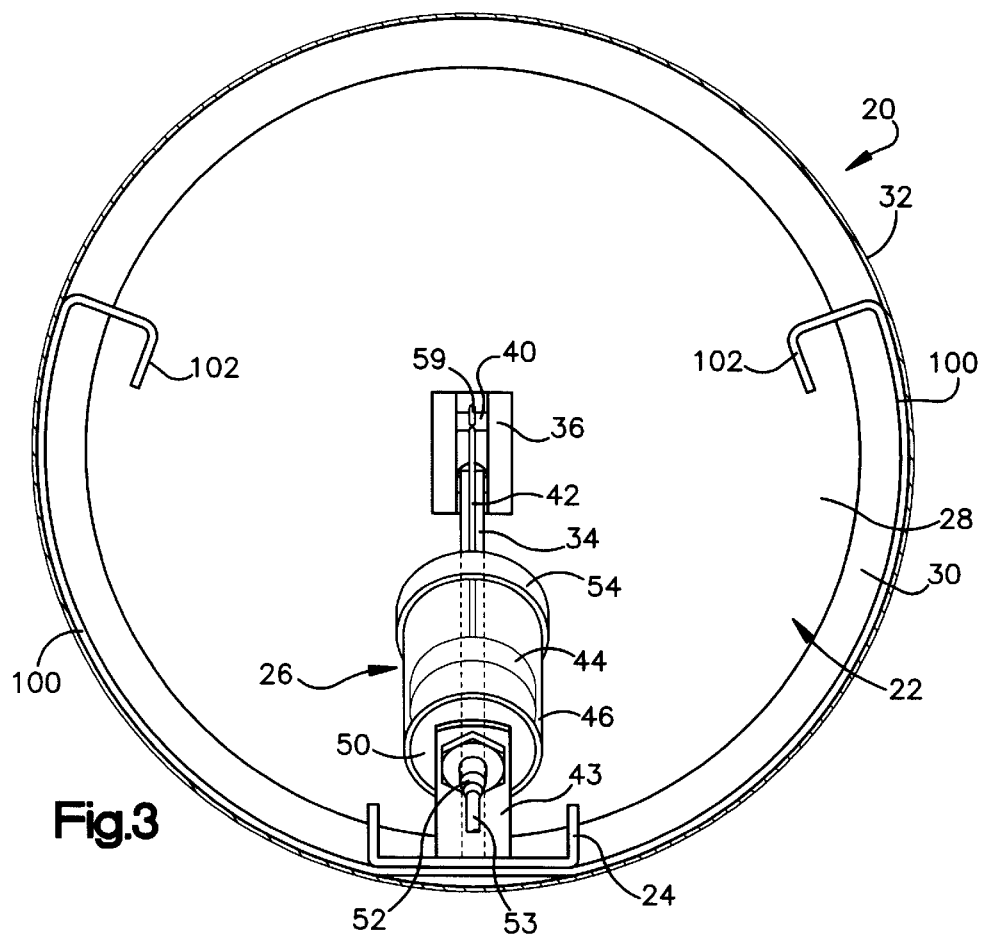
FIG. 3 is a rear view of the damper assembly and duct of FIG. 2.

Referring initially to FIGS. 1–3, a damper assembly 20 in accordance with the present invention includes a damper vane 22, a base 24 and a piston actuator 26.

The damper vane 22 generally is formed of rigid plate 28, such as a metal plate, and may also include a resilient member 30 that projects beyond the rigid plate to form a sealing flap along the peripheral edge of the rigid plate 28. The damper vane generally has a shape that approximates the shape of a cross-section of a duct 32, such as a rectangular shape or a disk or circular shape, and the sealing flap can mold to the contour of the duct to provide a positive seal even if the duct is dented or otherwise irregularly shaped, such as, for example, a duct having a raised seam. Consequently, when the damper vane is in its closed position, generally perpendicular to the axis of the duct, the peripheral sealing flap resiliently engages and seals against the inner surface of the duct to close the gap between the outer periphery of the rigid plate and the inner surface of the duct.

The damper vane 22 is pivotally mounted to the distal end of a support arm 34 that projects from one side of the base 24. For larger damper vanes, multiple support arms may be used to support the damper vane for rotation (see FIG. 10, for example, reference number 222). The damper vane is pivotally movable between a position generally parallel to the base 24 (its open position) and a position generally perpendicular to the base (its closed position). In the illustrated embodiment, the support arm is a rod to which the damper vane is pivotally connected through a pivot mount 36 provided at the center of the damper vane.

The illustrated pivot mount 36 is a pivot block centrally secured to the damper vane 22. The pivot block has a clevis pin 38 at one side thereof for pivotally mounting the pivot block, and thus the damper vane, to the support rod 34. The damper vane pivots about an axis parallel to the damper vane that passes through the clevis pin. The pivot block also includes a drive pin 40 spaced from the clevis pin that provides a point of attachment for a drive rod 42 interconnecting the damper vane 22 and the piston actuator 26.

The piston actuator 26 is a pneumatically actuated piston-cylinder actuator mounted to the base by a bracket 43. The piston-cylinder actuator includes a piston 44 axially movable within a cylinder 46. The piston is sized and shaped to fit closely within the cylinder. The piston and cylinder have smooth surfaces at the sliding interface therebetween for relatively friction-free movement. The material for the cylinder is selected from the group including glass, resins and polymers. In the illustrated embodiment, the cylinder is a glass cylinder (the cylinder may be formed of Pyrex® glass, for example) having an integral fitting 50 that closes one end of the cylinder. The fitting has an outwardly projecting neck externally threaded to facilitate securing the actuator to the bracket. The fitting also is provided with a nipple 52 for connection to a pneumatic control system (not shown), as by means of a flexible tube 53. The control system may further include a controller and a vacuum source or fluid pump to provide vacuum/pressure control signals to the actuator to move the piston 44.

The other end of the cylinder 46 opposite the fitting 50 is provided with a cap 54 to retain the piston 44 in the cylinder. The cap may be made of plastic, for example, and has an oversized opening 55 therein for passage of the drive rod 42 therethrough to connect to the piston.

The piston 44 preferably is a cylindrical metal piston that closely fits within the cylinder 46 for smooth, low friction, sliding movement. The piston may be made of a material selected from the group including metal, powder metal, glass, resins and polymers. The piston may have a coating of a friction-reducing material such as a Teflon® (polytetrafluoroethylene) coating or a dry lubricant formed from carbon powder, for example, at the surface thereof. The outer surface of the piston and the inner surface of the cylinder are smooth to provide an interface that functions as an air tight seal, thereby eliminating the need for elastomeric seals or the like that normally would introduce additional friction into the system.

The piston 44 is connected to the damper vane 22 by the drive rod 42. The drive rod is connected between the piston and the damper vane such that linear movement of the piston effects pivotal movement of the damper vane. The drive rod is connected to the piston by a ball joint 58. A loop 59 in the opposite end of the drive rod passes around the drive pin 40 in the pivot block 36. This arrangement allows the drive pin to rotate within the loop while transferring axial loads through the drive rod. Slop or lateral space along the drive pin between portions of the pivot block relative to the width of the loop in the drive rod compensates for misalignment between the pivot block 36 and the actuator 26, allowing the actuator to pivot the damper vane 22 without transferring lateral forces through the drive rod that could cause the piston to bind in the cylinder 46. Alternatively, ball joints may be provided at both ends of the drive rod to preclude side loads and twisting moments from acting on the drive rod to bind the piston in the cylinder.

Figure 4:
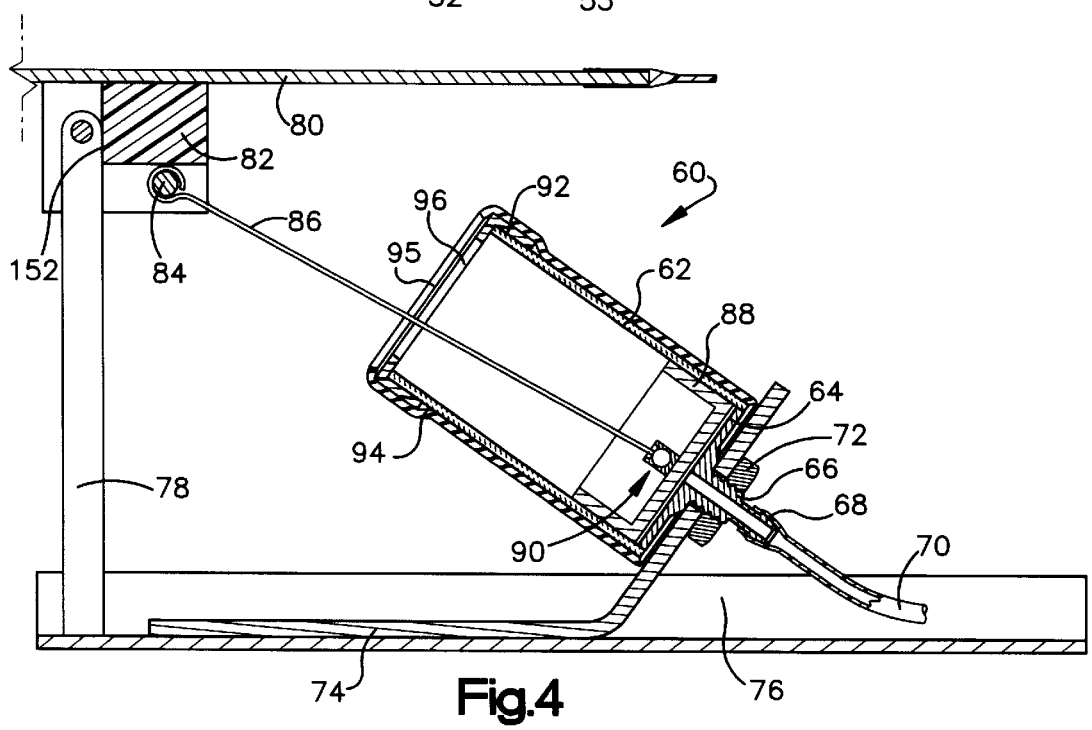
FIG. 4 is an enlarged partial cross-sectional view of a damper assembly in accordance with the present invention.

An enlarged view of an actuator 60 that is substantially the same as the actuator 26, is shown in FIG. 4. The actuator includes a glass cylinder 62 having a fitting 64 that closes one end. The fitting has an extension 66 that includes a nipple 68 that is connected to a control system (not shown) via a tube 70. The extension has a threaded portion that enables a nut 72 to secure the actuator to a bracket 74 that is connected to a base 76.

A support rod 78 fixed at one end of the base 76 supports at its opposite end a damper vane 80 through a pivot block 82. The pivot block includes a drive pin 84 around which an end of a drive rod 86 is looped. The opposite end of the drive rod is connected to the piston with a ball joint 90. The piston is movably mounted within the cylinder and retained therein by a cap 92 at an end of the cylinder opposite the fitting.

The actuator also includes a protective boot 94 covering the outer surface of the cylinder, which boot may be made of rubber or other elastomeric or suitable material. Both the boot and the cap have concentric openings 95, 96, respectively, for passage of the drive rod therethrough. In the illustrated embodiment, the damper vane is in its open position.

Returning to FIGS. 1–3, the damper assembly 20 further includes at least two oppositely directed wall-engaging members 100 movable towards each other against a biasing force to insert and then hold the damper assembly in the duct 32. The wall-engaging members can be moved toward each other and held in a retracted position for inserting or removing the damper assembly from a duct. When the wall-engaging members are released, under the influence of the bias force they move toward a bias position and press against the walls of the duct. The wall-engaging members hold and automatically align and center the damper assembly within the duct.

The wall-engaging members 100 in the illustrated embodiment are resilient wings formed by a leaf spring connected to the base 24. In the illustrated embodiment, the leaf spring includes handles (finger grips) 102 for holding the leaf spring in the retracted position for insertion into the duct 32. The handles preferably are integrally formed at the distal ends of the leaf spring. Although the illustrated embodiment uses a leaf spring, other wall-engaging members may be used to secure the damper assembly within a duct, such as a different spring arrangement, a scissor-jack arrangement, or a deformable expansion device biased to an expanded position.

The duct wall-engaging members 100 preferably apply substantially equal force against opposing walls of the duct 32 to center and align the damper assembly 20 in the duct. The wall-engaging members may apply unequal force against the duct wall to position the damper assembly off-center as well. A damper assembly having such wall-engaging members is particularly advantageous when the external surface of the duct is inaccessible, permitting the damper assembly to be installed from an end of the duct, perhaps with just one hand. The automatic positioning provided by the wall-engaging members is particularly advantageous in a blind installation where the installer cannot easily see into the duct. In addition, the automatic positioning provided by the wall-engaging members minimizes the chance that the rigid portions of the damper vane would scrape against the duct wall as it moves, thereby providing further assurances that the damper assembly would generate minimal noise in operation.

Referring now to FIG. 5, a damper assembly 110 is shown that is installed through an opening 112 in the wall of a duct 114. Such a method of installation is shown and described in commonly owned U.S. Pat. No. 5,458,148, the entire disclosure of which is hereby incorporated herein by reference. Naturally, this type of installation requires access to an outside surface of the duct.

The damper assembly 110 includes a base 116 that covers the opening 112 in the duct 114 and is secured to the outside of the duct, using, for example, mechanical fasteners (e.g., sheet metal screws), an adhesive, or even a magnet. The base has a curved shape that approximates the contour of the outer surface of the duct. An actuator 118 and a damper vane 120 are supported by the base such that the damper vane and the actuator are substantially contained within the duct. The actuator 118 is substantially the same as the actuator 26 described above, although rather than being supported on a bracket, the actuator 118 is mounted directly to the base 116 such that the nipple 122 extends outside the duct for connection to a control assembly (not shown) through a supply line 124. In the illustrated embodiment, the actuator is perpendicular to the base and the damper vane is in its closed position. The open position of the damper vane, and the corresponding position of the piston actuator, are shown in phantom lines. In this configuration the piston actuator presents a minimal profile outside the duct, which is advantageous in shallow clearance situations, as well as providing an improved appearance.

Referring now to FIG. 6, another damper assembly 130 is shown that is installed through an opening 132 in the wall of a duct 134. Unless the difference is specifically identified, the damper assembly 130 is substantially identical to the damper assembly 110 shown in FIG. 5. As in FIG. 5, the damper assembly 130 is shown in a closed condition, with the position of the damper vane 136 and the other components, when the damper vane is in an open position, being shown in phantom lines. The damper assembly includes a base 137 that is attached to the outside of the duct, a damper vane 136 supported within the duct by the base, and an actuator 138 operatively connected to the damper vane through a drive rod 140 and a pair of ball joints 142. The actuator includes a piston 144 movable within a cylinder 146.

Although the range of travel of the piston 144 within the cylinder 146 may be calibrated to provide the desired movement of the damper vane 136, it may be difficult or impossible to maintain accurate movement of the damper vane over time. Consequently, positive stops are provided to facilitate consistently moving the damper vane between the open position and the closed position. In the illustrated embodiment, the actuator 138 is mounted to the base 137 at an angled orientation by a bracket 148. The bracket 148 is substantially similar to the bracket 43 described above with respect to FIGS. 1–3. However, in the embodiment shown in FIG. 6 the bracket 148 extends past the point where the actuator is mounted to provide a stop that engages the damper vane 136 when the damper vane is in the open position. The bracket/stop positively locates the damper vane in its open position. The support rod 150 and/or a portion of the base may provide a similar function when the damper vane is in the closed position (as shown, for example, in FIG. 2).

In addition, the pivot block 82 may be configured to provide positive stops for limiting movement of the damper vane 136 beyond its open or closed positions. For example, as shown in FIG. 4, the pivot block 82 has a stop surface 152 that abuts a side of the support rod 78 when the damper vane 80 is pivoted to its open position.

Moving on to FIGS. 7 and 8, another a damper assembly 160 is shown. The damper assembly may be inserted into a duct (not shown) adjacent the duct outlet, generally into a part of the duct referred to as the boot, where the damper assembly may be held in the duct by gravity or with a friction fit. The base of the damper assembly is in the form of a frame 162 having side walls 164 configured to approximate the cross-sectional shape of a duct. The frame may include mounting extensions or mounting tabs 166 extending from the side walls for securing the damper assembly within the duct, for example, using mechanical fasteners installed inside the duct from the duct outlet. The frame also has a gasket 168 circumferentially attached to at least a portion of the outer circumference of the frame to sealingly engage the inner circumference of the duct and to fill any voids between the damper and the duct. The gasket may have a teardrop cross-sectional shape to provide an improved fit between the outside of the frame and the duct.

Inside the frame 162, the damper vane 170 is a metal plate pivotally supported for rotation between open and closed positions, the open position being shown in phantom in FIG. 8. The frame includes stop portions 172 that cooperate to define the closed position. The stop portions include a sealing material 171 that cooperates with the damper vane to seal the opening formed by the frame when the damper vane is in a closed position. Alternatively, the sealing material may be applied to the damper vane so as to contact the stops when the damper vane moves to the closed position.

An actuator 176, substantially similar to the actuator 26 described above, is mounted to the frame through a bracket 178 and moves the damper vane between its open and closed positions. The actuator is connected to the damper vane through a slot 180 in the damper vane and a drive pin 182 mounted between a pair of bent tabs 184 extending from the damper vane on a side opposite the actuator. The actuator may be centrally mounted or offset mounted, for example, for use with offset end boots. However, the actuator is mounted within the confines of a projection of the frame 162 in an axial direction (parallel to the axis of the duct) so that the entire damper assembly fits within a duct. The supply line for the control assembly, such as pneumatic tubing 186, can be fished through the duct to the control assembly or to a location where it can conveniently be brought out of the duct.

This type of damper assembly is particularly advantageous where the only access to the duct is through a duct outlet. This is made possible by the small size of the actuator needed to operate the damper vane. Furthermore, the actuator can be located within the duct without unduly compromising the cross-sectional area of the duct available for fluid flow. Thus, the present invention provides for the ability to retrofit buildings with inaccessible or enclosed ductwork to provide zone-based heating or cooling that heretofore was impractical.

Figure 9:
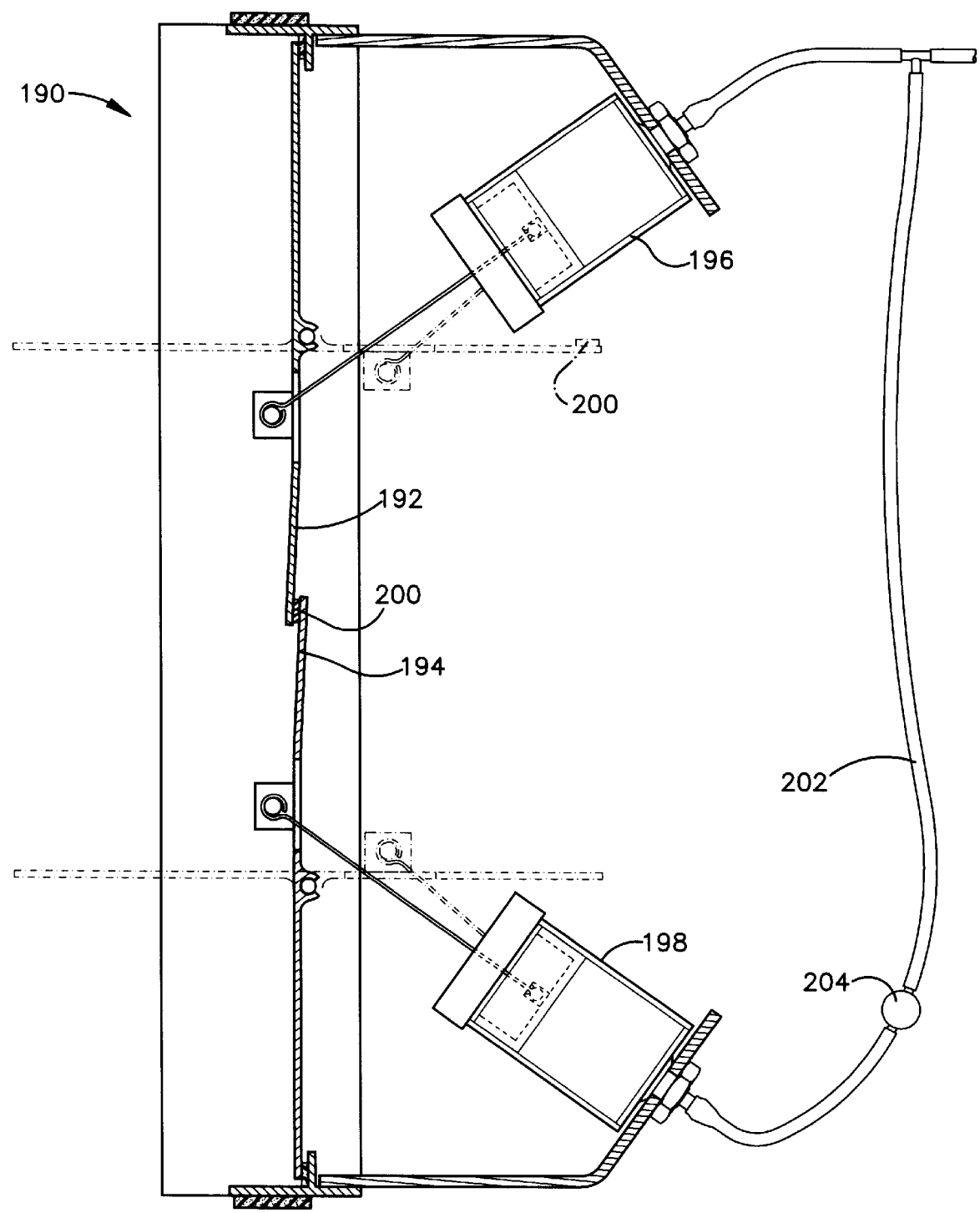
FIG. 9 is a cross-sectional side view of yet another damper assembly in accordance with the present invention.

Another damper assembly 190, shown in FIG. 9, is substantially the same as the damper assembly 160 shown in FIGS. 7 and 8, except as otherwise noted. The damper assembly 190 includes multiple damper vanes 192 and 194 with each vane having its own actuator 196, 198, respectively. The use of multiple damper vanes is particularly advantageous in larger ducts where a larger damper vane would require greater clearance between the damper assembly and the duct outlet. The open positions of the damper vanes are shown in phantom lines. One or more of the damper vanes may include a sealing material 200 that separates the damper vanes when an adjacent damper vane is in its closed position. The sealing material not only helps to create a tight seal but also minimizes or eliminates vibration and noise at the junction of the damper vanes. The multiple-vane design also allows for additional control or regulation of the airflow through the damper assembly, particularly in fresh-air/economizer HVAC systems.

The supply lines 202 from the controller (not shown) to the actuators may include one or more one-way restrictor valves 204 that restricts the fluid control signal so that the damper vanes move to the closed position in a sequential manner, with the damper vane having more restrictor valves limiting the control signal and causing that damper vane 198 to move more slowly, thereby avoiding interference at the overlap or junction between the damper vanes as they move to their closed positions.

Figure 10:
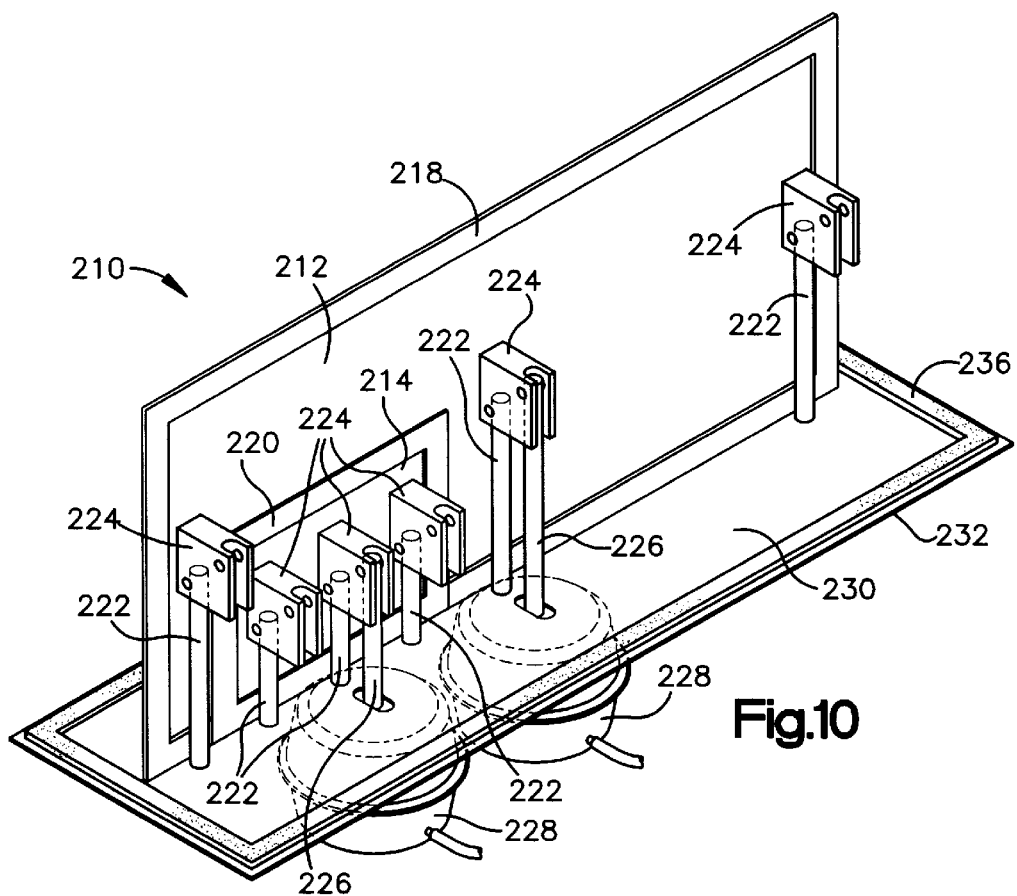
FIG. 10 is a rear perspective view of still another damper assembly in accordance with the present invention.
Figure 11:
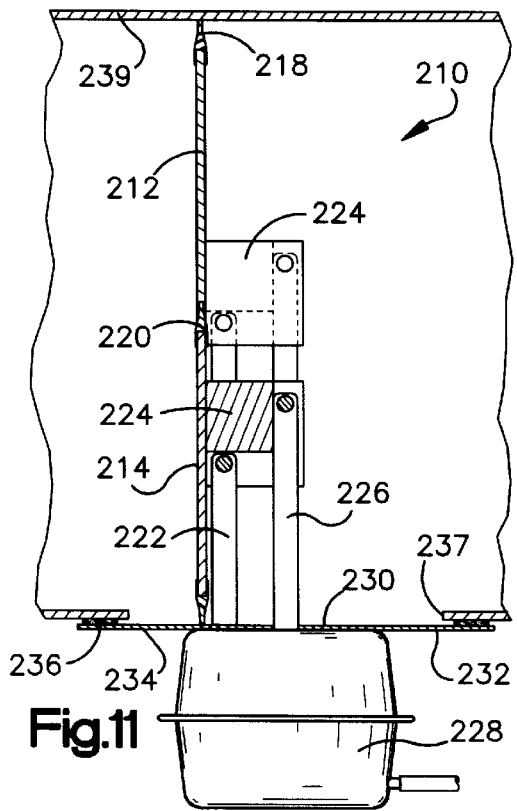
FIG. 11 is a cross-sectional side view of the damper assembly of FIG. 10.
Figure 12:
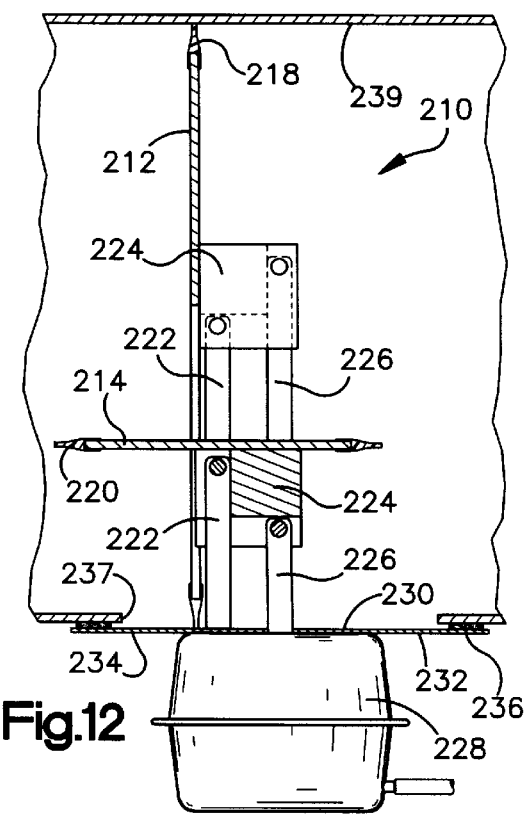
FIG. 12 is a cross-sectional side view of the damper assembly of FIG. 10, with a smaller damper vane in an open position and a larger damper vane in a closed position.

An alternative multiple vane damper assembly 210 is shown in FIGS. 10–15. Referring initially to FIGS. 10–13, the damper assembly 210 includes two damper vanes: a first or larger damper vane 212 and a second or smaller "window" damper vane 214. The larger damper vane 212 includes a window or aperture 216 therein and the smaller damper vane 214 seals the aperture when both damper vanes are in their closed positions, as shown in FIG. 10. The damper vanes are formed of rigid plates with gaskets 218, 220 that form sealing flaps about the outer periphery of the larger and smaller damper vanes, respectively. In the illustrated embodiment, the larger damper vane does not include a gasket within the aperture, although one could be provided. The smaller damper vane can be moved to its open position independently of the larger damper vane to provide a smaller airflow, as shown in FIG. 12. When both damper vanes are in their open positions, as shown in FIG. 13, the damper vanes will lie in the same or substantially parallel planes.

In the illustrated embodiment, each damper vane 212, 214 is supported for pivotal movement on three sets of support rods 222 and pivot blocks 224, with the central pivot block for each damper vane being connected to a drive rod 226 that is connected to a diaphragm actuator 228. The damper vanes are supported on a first side 230 of a base 232, and the actuators are connected to a second side 234 of the base opposite the first side. The illustrated base has a sealing material 236 about at least a portion of the circumference of the first side of the base. The damper assembly 210 can be installed through an opening 237 in the side of a duct 239, and the sealing material helps seal the opening when the base is secured to an external surface of the duct. The illustrated damper assembly includes diaphragm actuators 228, such as those disclosed in the aforementioned U.S. Pat. No. 5,458,148. However, the above-described pneumatic piston-cylinder actuators could be used in their place, particularly when access to the outer surface of the duct is limited or unavailable.

Although only two damper vanes are shown in the illustrated embodiment, any number of damper vanes could be used to supply different volumes of air through the damper assembly to mix fresh air with return air in varying proportions, to bring in a large amount of fresh air for cooling when outdoor air temperatures permit, to provide a varied amount of conditioned air according to varied requirements and/or to supply a constant but smaller amount of airflow until a greater or full amount of air supply is needed. Another advantage is that by opening only a minimal amount of damper vanes, noise created by a large volume of air directed toward a relatively small outlet is minimized or eliminated.

The damper assembly 211 shown in FIGS. 14 and 15 is the same as the damper assembly 210 in FIGS. 10–13 except that the damper assembly 211 further includes a spring 240 connected to the drive rod 226 between a washer 242 mounted to the drive rod and the base 232 to bias the damper vane 214 toward either the open position or the closed position: in this case, the closed position. This feature is particularly advantageous in the event of a power failure, such that removal of a control signal, in the form of a vacuum or pressurized fluid applied to the actuator 228, provides automatic closure of the damper vane under the action of the spring or other biasing device. The spring may also be used as 8a power assist to reduce the power required to open or close the damper vane. In addition, a magnet could be used to hold the damper vane in either an open or a closed position, wherein in the event of a power failure, the damper vane would remain in that position.

Although the invention has been shown and described with respect to certain illustrative embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A damper assembly comprising a frame circumscribing an opening and configured for Insertion into a duct; a damper vane mounted to the frame for movement between an open position and a closed position, and a piston-cylinder actuator connected between the frame and the damper vane for moving the damper vane between the open and closed positions; the piston-cylinder actuator including a piston and a cylinder that have cooperating nonelastomeric sliding sealing surfaces which provide essentially friction-free axial movement of the piston relative to the cylinder.

2. A damper assembly as set forth in claim 1, wherein the cooperating sealing surfaces include a substantially continuous inner circumferential surface of the cylinder, and a substantially continuous outer circumferential surface of the piston.

3. A damper assembly as set forth in claim 1, wherein the piston is formed of a material selected from the group including metal, powdered metal, resin, glass, and polymer.

4. A damper assembly as set forth in claim 3, wherein the sealing surface of the piston has a friction-reducing coating.

5. A damper assembly as set forth in claim 1, wherein the cylinder is formed of a material selected from the group including metal, powdered metal, resin, glass, and polymer.

6. A damper assembly as set forth in claim 5, wherein the sealing surface of the cylinder has a friction-reducing coating.

7. A damper assembly as set forth in claim 1, wherein the piston-cylinder actuator is a pneumatic piston-cylinder actuator.

8. A damper assembly as set forth in claim 7, wherein the piston-cylinder actuator includes a fitting at one end of the cylinder to connect the actuator to a pneumatic control system.

9. A damper assembly as set forth in claim 1, further comprising a base mounted to the frame to support the piston-cylinder actuator.

10. A damper assembly as set forth in claim 9, wherein the piston-cylinder actuator includes a fitting at one end of the cylinder that has a threaded portion for mounting the actuator relative to the base.

11. A damper assembly as set forth in claim 9, wherein the piston-cylinder actuator is mounted substantially perpendicularly to the base.

12. A damper assembly as set forth in claim 9, wherein the damper vane and the piston-cylinder actuator are mounted on the same side of the base.

13. A damper assembly as set forth in claim 12, further comprising a stop extending from the base for positively defining the open position or the closed position of the damper vane.

14. A damper assembly as set forth in claim 1, wherein the damper vane and the piston-cylinder actuator are interconnected by a drive rod.

15. A damper assembly as set forth in claim 14, wherein the drive rod is mounted to transfer substantially only axial forces between the actuator and the damper vane.

16. A damper assembly as set forth in claim 1, further comprising a substantially cylindrical protective boot that substantially covers the outer circumferential surface of the cylinder.

17. A damper assembly as set forth in claim 1, further comprising a frame having side walls that approximate a cross-sectional shape of a duct.

18. A damper assembly as set forth in claim 17, wherein the frame supports the damper vane for pivotal movement about an axis.

19. A damper assembly comprising a frame having side walls that approximate a cross-sectional shape of a duct, a gasket positioned about at least a portion of an outer circumference of the frame, a damper vane movable between an open position and a closed position, and a piston-cylinder actuator connected to the damper vane for moving the damper vane between the open and closed positions; the piston-cylinder actuator including a piston and a cylinder that have cooperating nonelastomeric sliding sealing surfaces which provide essentially friction-free axial movement of the piston relative to the cylinder.

20. A damper assembly as set forth in claim 1, wherein the damper vane includes a plurality of damper vanes that cooperate to close a cross-section of a duct when the damper vanes are in closed positions.

21. A damper assembly as set forth in claim 20, wherein the piston actuator includes a plurality of piston actuators, each piston actuator operatively connected to one of the plurality of damper vanes.

22. A damper assembly as set forth in claim 20, wherein the plurality of damper vanes includes a first damper vane that has an aperture and a second damper vane that closes the aperture when both the first damper vane and the second damper vane are in their respective closed positions.

23. A damper assembly as set forth in claim 22, wherein the first damper vane and the second damper vane lie in substantially parallel planes when both the first damper vane and the second damper vane are in the open positions.

24. A duct section having a damper assembly therein as set forth in claim 1.

25. A damper assembly comprising a frame having a cross-sectional shape generally corresponding to a cross-sectional shape of a duct, at least one damper vane mounted to the frame for pivotal movement between an open position and a closed position, at least one actuator connected to the at least one damper vane to controllably move the at least one damper vane between the open and closed positions, the at least one actuator located within the confines of a projection of the frame in an axial direction, and an elastomeric member disposed on the exterior of the frame to sealingly engage the frame with a duct wall.

26. A damper assembly as set forth in claim 25, wherein the elastomeric member surrounds the periphery of the frame.

27. A method of installing a damper assembly in a duct, comprising the steps of: providing a damper assembly as set forth in claim 1, removing a register from a duct outlet, inserting the damper assembly into a duct adjacent the outlet, and replacing the register.

\* \* \* \* \*